United States Patent
Van Patten Benhase et al.

(10) Patent No.: US 7,917,660 B2
(45) Date of Patent: Mar. 29, 2011

(54) CONSISTENT DATA STORAGE SUBSYSTEM CONFIGURATION REPLICATION IN ACCORDANCE WITH PORT ENABLEMENT SEQUENCING OF A ZONEABLE SWITCH

(75) Inventors: Linda Van Patten Benhase, Tucson, AZ (US); John Charles Elliott, Tucson, AZ (US); Robert Akira Kubo, Tucson, AZ (US); Gregg Steven Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 11/837,985

(22) Filed: Aug. 13, 2007

(65) Prior Publication Data

US 2009/0049239 A1   Feb. 19, 2009

(51) Int. Cl.
*G06F 3/00* (2006.01)
*H04L 12/28* (2006.01)

(52) U.S. Cl. .......................................... 710/8; 370/254

(58) Field of Classification Search ..................... 710/8
See application file for complete search history.

(56) References Cited

U.S. PATENT DOCUMENTS

| 7,093,069 B2 * | 8/2006 | Chong, Jr. ............... 711/114 |
| 7,107,328 B1 | 9/2006 | Muthiyan et al. ........... 709/220 |
| 2005/0102549 A1 | 5/2005 | Davies et al. .................. 714/4 |
| 2005/0114474 A1 * | 5/2005 | Anderson et al. ........... 709/220 |
| 2005/0240776 A1 | 10/2005 | Schmidt et al. ............... 713/185 |
| 2006/0136704 A1 | 6/2006 | Arendt et al. .................. 713/2 |
| 2006/0140211 A1 * | 6/2006 | Huang et al. ................ 370/466 |
| 2006/0265449 A1 * | 11/2006 | Uemura et al. .............. 709/203 |
| 2008/0107042 A1 * | 5/2008 | Rengarajan et al. ........ 370/254 |

* cited by examiner

*Primary Examiner* — Henry W Tsai
*Assistant Examiner* — Titus Wong
(74) *Attorney, Agent, or Firm* — John H. Holcombe

(57) ABSTRACT

Consistency for replicating data storage subsystem configurations in accordance with a "golden" configuration file. A data storage subsystem comprises a blade system configured to support a plurality of blades and a storage system, each arranged in a predetermined slot of the blade system, and at least one zoneable switch whose zoning is disabled at power on. A management module operates the blade system to power on all slots. The storage system, in accordance with a "golden" configuration file, transfers port enablement sequencing to the switch, and the switch enables and zones ports in sequence to allow the server blades to see the storage system in accordance with the port enablement sequence. The storage system is configured with the "golden" configuration file to log on the server blades in accordance with the port enablement sequence to logically configure the server blades in accordance with the "golden" configuration file.

12 Claims, 4 Drawing Sheets

CONSISTENT DATA STORAGE SUBSYSTEM CONFIGURATION REPLICATION IN ACCORDANCE WITH PORT ENABLEMENT SEQUENCING OF A ZONEABLE SWITCH

DOCUMENT INCORPORATED BY REFERENCE

Commonly assigned, copending U.S. patent application Ser. No. 11/460,166, filed Jul. 26, 2006, is incorporated for its showing of a RAID controller and storage disposed in a storage blade enclosure with server blades.

CROSS REFERENCE TO RELATED APPLICATIONS

Commonly assigned U.S. patent application Ser. No. 11/837,938, filed on even date herewith relates to a blade system configured to support a plurality of blades and a storage system, each arranged in a predetermined slot of the blade system. A management module operates the blade system to first power on the storage system, and subsequently to power on the plurality of server blades in a sequential order that matches a blade system natural boot sequence order, skipping the storage system, and the storage system is configured with the "golden" configuration file to log on the server blades in accordance with the power on sequence to logically configure the server blades in accordance with the "golden" configuration file.

Commonly assigned U.S. patent application Ser. No. 11/837,966, filed on even date herewith relates to a blade system configured to support a plurality of blades and a storage system, each arranged in a predetermined slot of the blade system. A management module operates the blade system to first power on the storage system. In accordance with a "golden" configuration file, the storage system passes sequence information to the management module. The management module powers on the plurality of server blades in accordance with the sequence information. The storage system is configured with the "golden" configuration file to log on the server blades in accordance with the power on sequence to logically configure the server blades in accordance with the "golden" configuration file.

Commonly assigned U.S. patent application Ser. No. 11/838,005, filed on even date herewith relates to a blade system configured to support a plurality of blades and a storage system, each arranged in a predetermined slot of the blade system. The server blade slot versus WWN information is collected and provided to the storage system. The storage system arranges a configuration of the server blades in accordance with a "golden" configuration file, converting "golden" configuration file slot information to WWNs. The server blades are logically configured as they log on with WWNs in accordance with the "golden" configuration file.

FIELD OF THE INVENTION

This invention relates to data storage subsystems, and, more particularly, to the configurations of data storage subsystems.

BACKGROUND OF THE INVENTION

Data storage subsystems, such as subsystems comprising numbers of hard disk drives, for example, in blade and in RAID (Redundant Array of Independent Disks) arrangements, may be configured manually by or for customers who want particular files or logical volumes to be available for particular circumstances.

In one example, a customer with retail centers across the country or world may wish to have several applications that access certain files of the data at each retail center. Examples include a real time transaction application, a back up application, an inventory application, etc., and all will own some of the logical volumes stored by the data storage subsystem. The customer may also want the logical volumes and applications to be consistent across the country or world.

In accordance with the incorporated '166 application, a blade system may now comprise the storage system and servers in the form of blades.

To meet the consistency criteria, a manual boot up may be conducted at each blade system instead of a normal boot up which may follow a particular sequence, such as slot number, in a blade arrangement, and the storage system and files manually configured with respect to the servers.

SUMMARY OF THE INVENTION

Data storage subsystems, computer program products and methods provide consistency for replicating data storage subsystem configurations.

In one embodiment, a "golden" configuration file is created for a data storage subsystem which comprises a blade system with a plurality of slots and at least one zoneable switch, the blade system configured to support a plurality of blades. A plurality of server blades are each arranged in a predetermined slot of the blade system; and at least one storage system is arranged in a predetermined slot of the blade system. The zoneable switch is configured to zone ports thereof, the ports coupled to the plurality of server blades and the storage system(s), and the zoneable switches' zoning is disabled at power on. A management module is configured to operate the blade system to power on all slots comprising the server blades and the storage system(s). The storage system, in accordance with a "golden" configuration file, is configured to transfer port enablement sequencing to the zoneable switch, whereby the zoneable switch is configured to enable and zone the ports in the enablement sequence to connect the server blades and storage system(s) in accordance with the enablement sequence. The storage system is configured with the "golden" configuration file to log on the server blades in accordance with the log on sequence of the server blades as the result of the enablement sequence to logically configure the server blades in accordance with the "golden" configuration file.

In a further embodiment, the storage system is configured to employ the "golden" configuration file to create a logical configuration matching "placeholder" hosts to the expected order of log on of the server blades.

In a still further embodiment, the "placeholder" hosts are replaced by server blade WWNs as the server blades log on.

In another embodiment, the storage system is configured to allocate a set of logical volumes of the storage system to each server blade in accordance with the "golden" configuration file.

In still another embodiment, the management module is configured to, subsequent to the power on sequence, initiate said port zoning enablement of the at least one zoneable switch in response to "ready" from the storage system.

In another embodiment, a data storage subsystem comprises a blade system with a plurality of slots and a zoneable switch, a plurality of server blades, each arranged in a slot of the blade system, at least one storage system arranged in at least one slot of the blade system. The storage system configured to save a host to slot number mapping of the server blades and at least one storage system, wherein "placeholder" hosts are created in any order, and port enablement sequence for the zoneable switch, of a "golden" configuration file arranged to provide a boot order log on sequence for another blade system, the blade system configured to support a plurality of blades; a plurality of server blades, each arranged in a slot of the blade system; at least one storage system arranged in at least one slot of the blade system; and a storage system configured to save a host to slot number mapping of the server blades and at least one storage system, wherein "placeholder" hosts are created in any order, as sequence information of a "golden" configuration file arranged to provide a log on sequence for another blade system.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
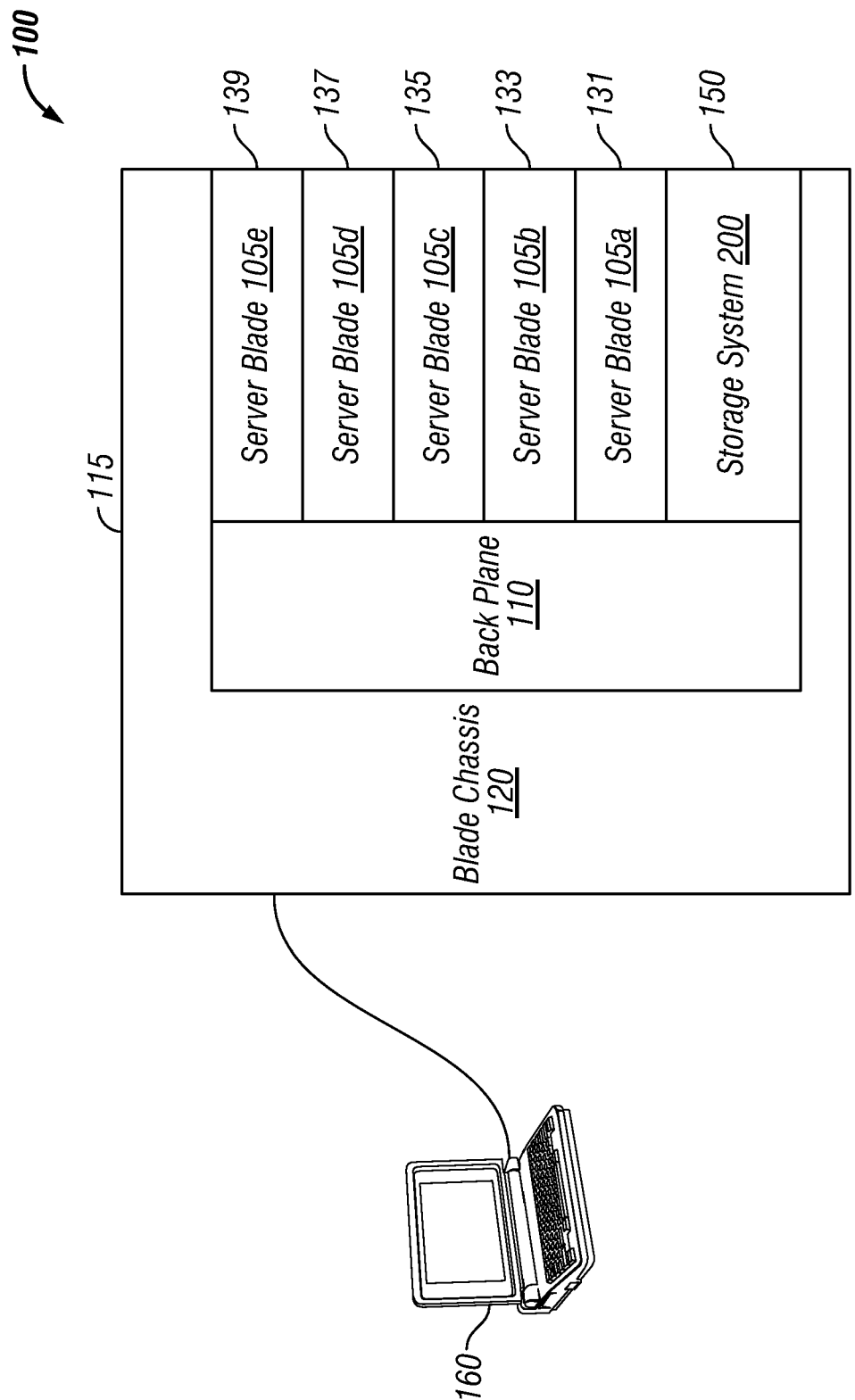
FIG. 1 is a block diagram of a data storage subsystem comprising a blade system.
Figure 2:
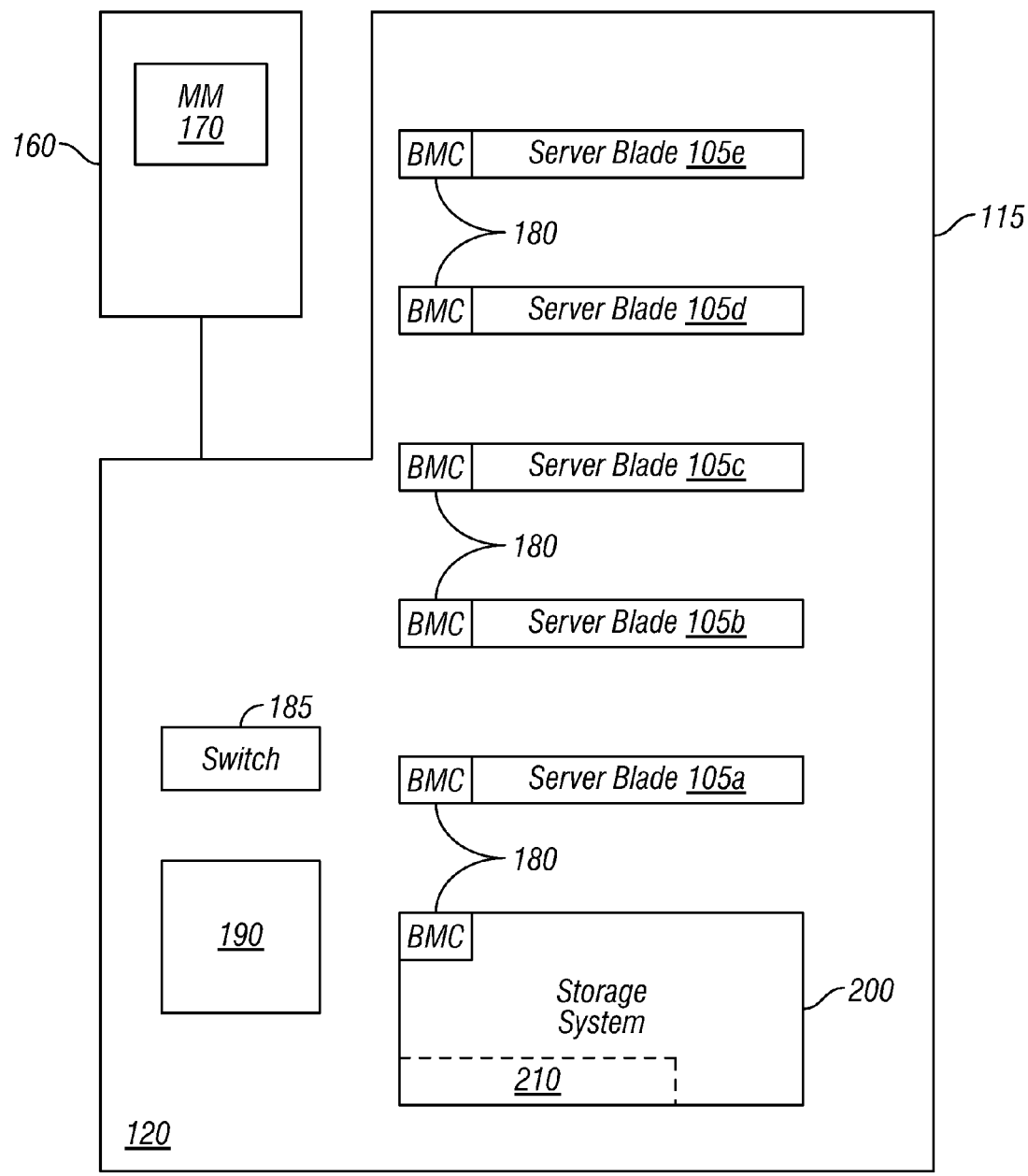
FIG. 2 is a diagrammatic illustration of the data storage subsystem of FIG. 1.

Referring to FIGS. 1 and 2, an embodiment of a data storage subsystem 100 comprises a blade system 115 and an external computer system 160. As described in more detail in the incorporated '166 application, a blade system 115 may comprise servers 105 and one or more storage blades 200 mounted in a blade chassis 120 having a back plane 110. In one embodiment the blade chassis receives the server blades in slots 131-139 and a storage blade occupies slot 150. A slot may comprise mounting hardware for retaining a mounted device, as well as one or more interfaces such as data bus connectors, power couplings, air flow couplings, and the like for connecting a blade to the blade chassis 120. The mounting and connections are such that an administrator may easily replace a blade or add blades to vacant slots.

A server blade 105 may comprise one or more processors, one or more memory modules, interfaces and interface logic. Each server blade 105 may communicate with the back plane 110. A storage blade 200 may comprise a storage system of a controller or controllers 210 and one or more storage modules, for example, of hard disk drives. A data storage controller may comprise logic or one or more computer processors and memory, for example, arranged in a redundant system. The storage blade may be arranged in a RAID system of any suitable type, or may comprise a system known as JBOD (Just a Bunch of Disks). Examples of RAID systems are discussed in the incorporated '166 application. Alternatively, the storage system 200 may be partially arranged in a slot of the blade system, and partially arranged externally to the slots and in direct communication with the blade system.

The invention can take the form of an entirely hardware embodiment, an entirely software embodiment or an embodiment containing both hardware and software elements. In a preferred embodiment, the invention is implemented in software, which includes but is not limited to resident software, microcode, firmware, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer readable medium include a semiconductor or solid state memory, magnetic tape, a removable computer diskette, and random access memory (RAM), a read-only memory (ROM), a rigid magnetic disk and an optical disk. Current examples of optical disks include compact disk-read only memory (CD-ROM), compact disk-read/write (CD-R/W), DVD, and Blu-Ray.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Connections to the receiver may encompass connection links including intervening private or public networks. The communication links may comprise serial interconnections, such as RS-232 or RS-422, Ethernet connections, SCSI interconnections, ESCON interconnections, FICON interconnections, a Local Area Network (LAN), a private Wide Area Network (WAN), a public wide area network, Storage Area Network (SAN), Transmission Control Protocol/Internet Protocol (TCP/IP), the Internet, and combinations thereof.

The blade system 115 may comprise logic, a computer processor, etc., such as baseboard management controller function 180, for example, provided with respect to each server blade.

A zoneable switch 185 may be mounted in the back plane 110 and comprises a plurality of ports coupled to the slots 131-139 and slot 150. The zoneable switch selectively zones the ports so that the occupant of a slot can communicate with the occupant of another slot. For example, the zoneable switch zones a particular server occupying one particular slot with a storage system occupying another slot. The zoneable switch may comprise logic or a computer processor to generate the zoning interconnections.

The back plane may also comprise data bus connectors, power components including battery backup, air conditioning and flow components, and the like, indicated as element 190. The blade system 115 may comprise a storage area network, and/or be connected to an external storage area network.

The server blades may comprise or support applications that communicate with the storage blade, and that use particular files or logical volumes of the storage blade.

External computer system 160 may comprise one or more computer processors, logic, etc., configured for example as storage blade system management software or management module 170, configured to control much of the operation of the blade system 115. As one example, the external computer system 160 may comprise a PC. The management module 170 may comprise an application or the dominant application of the computer system 160. The management module 170 sets up and controls the logical configuration of the blade system, and controls and manages the blade system domain, which includes server blades, power supplies, fans, user interface, etc. Alternatively, the management module 170 may be internal to the blade system. Herein, the terms blade system storage management software and management module refer to one or more computer program products or programs for operating a blade system. Herein, the terms data storage controller or controllers, RAID controller or controllers, or controller or controllers, refer to one or more computer program products or programs for operating a storage system. The computer program product comprises a computer usable medium embodying a computer readable program when executed on a computer causes the computer to conduct a desired operation, as discussed above.

Blade systems may be provided on a local basis, for example, employed with a retail center of a national or international chain. As discussed above, customers may want these uses to be consistent across the country or world. In one example, a customer with retail centers across the country or world may wish to have several applications that access certain files of the data at each retail center. Examples include a real time transaction application, a back up application, an inventory application, etc., and all will own some of the logical volumes stored by the data storage subsystem. The customer may also want the logical volumes and applications to be consistent across the country or world.

Figure 3:
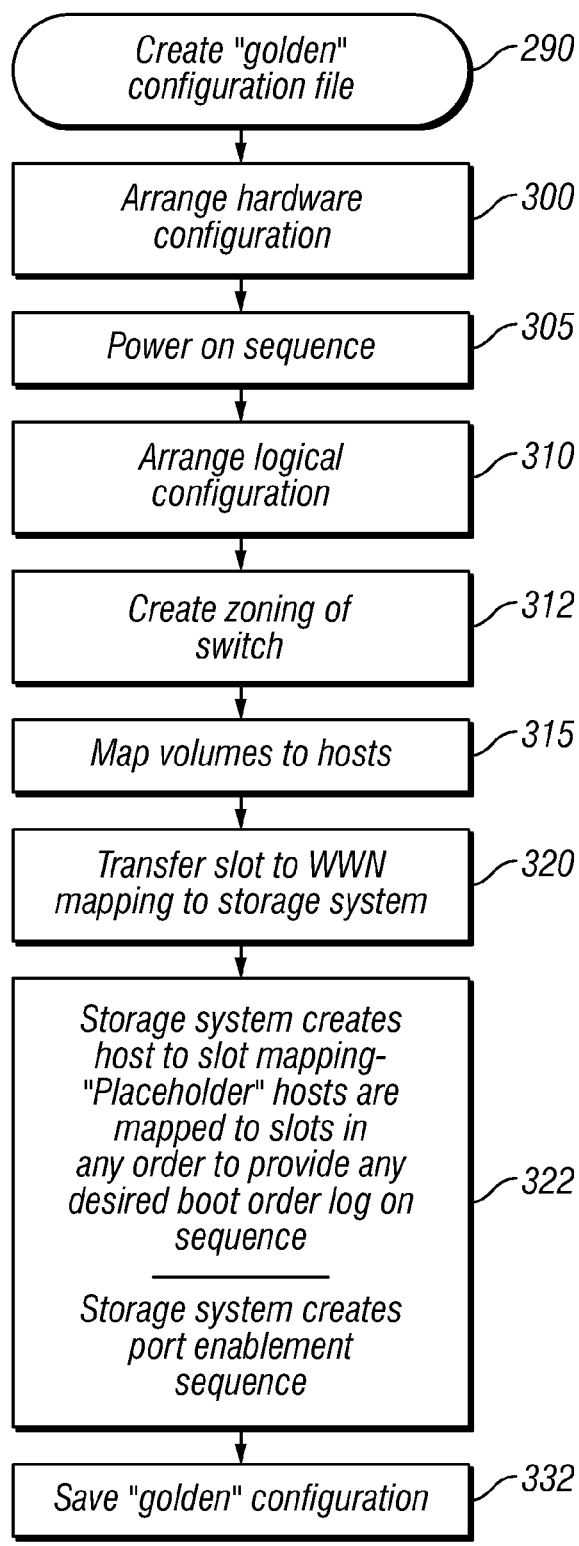
FIG. 3 is a flow chart depicting a computer implemented method for establishing a "golden" configuration file for a blade system.

Referring additionally to FIG. 3, in one embodiment, a blade system configuration may be established which is then distributed to local retail centers, including a "golden" configuration file created in the process beginning at step 290. In step 300, a plurality of server blades 105 and at least one storage system 200 with at least one data storage controller 210 are each arranged in a desired slot of the blade system, for example, by the user or administrator.

In step 305, an administrator, for example at the computer system 160, starts a manual the power on of the blade system 115, which, begins first with the storage system 200. The power on may be conducted by having the management module first place the blades in a standby state, for example by the baseboard management controller 180, and collect the inventory of WWNs and slot numbers for the blades. With this inventory, the user or administrator may direct the power on of the data storage controller. The user or administrator may have arranged the storage system 200 in advance, for example, to comprise one or more RAID systems employing one or more data storage controllers 210. A data storage controller may be employed additionally to develop the "golden" configuration file.

In step 310, the user or administrator arranges the various hosts in accordance with the desired storage system arrangement. As an example, the storage system may be arranged as two RAID arrays of different types and a spare drive. Each of the hosts is logically arranged to utilize volumes of one or both of the RAID arrays, perhaps having different applications which each uses the same or different volumes of the same RAID array.

In step 312, the user or administrator creates the zoning of the zoneable switch, arranging the zones or interconnections of the various hosts and storage systems to be provided by zoning the ports. For example, the hosts are identified by WWNs, and the slot positions and therefore the ports are unknown.

In step 315, the volumes of step 310 are manually assigned or allocated to the hosts, and mapped by the storage system, using the host WWNs. Step 315 may precede or follow step 312.

In step 320, the slot to WWN mapping is transferred to the storage system, for example, by the management module 170. Alternatively, the user or administrator provides the slot to WWN mapping to the storage system.

In step 322, the storage system creates host to slot mapping using the transferred slot to WWN mapping. "Placeholder" host names are mapped to the slots in any desired order to create the desired log on sequence. The log on sequence is key because the volume assignments or allocations are made by the storage system based on the sequence of log on.

Also in step 322, the storage system translates the slot numbers to the ports of the zoneable switch 185 to which the slots are coupled. The storage system creates the desired log on sequence by creating a port enablement sequence, which is the sequence in which the ports coupled to the host slots are zoned to the ports coupled to the storage system slot(s).

Although some server blades may take longer than others to boot up when powered on, the port enablement sequencing of the switch 185 results in the desired log on sequence if all of the hosts are booted up at the time of the port enablement.

In step 330, the storage system saves the port enablement sequence as part of a "golden" configuration file together with the zoning of the switch, identifying the ports of the switch, which are in accordance with the slot number and "placeholder" hosts of the server blades. Additionally, the allocations of sets of logical volumes of the storage system to each server blade may be saved as part of the "golden" configuration file. The "golden" configuration file of step 330 is arranged to provide the log on sequence for another blade system. The storage system may comprise special storage configuration management software that saves the "golden" configuration file and that may be separated from the remainder of the storage system module.

The "golden" configuration file may then be distributed to storage systems of other blade systems at the locations, for example retail centers, across the country or world that the customer wishes to be consistent.

Figure 4:
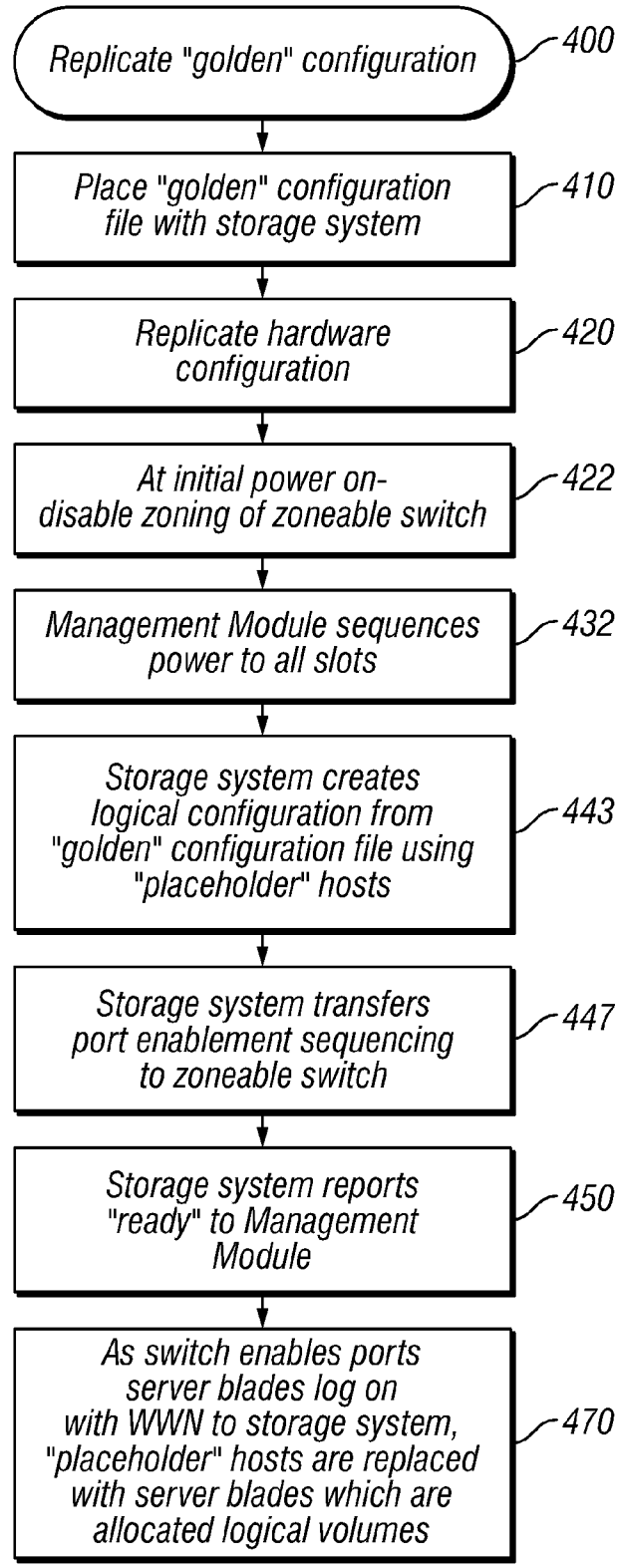
FIG. 4 is a flow chart depicting a computer implemented method for conducting a configuration of the data storage subsystem of FIGS. 1 and 2.

Referring additionally to FIG. 4, in step 400, the process to replicate the "golden" configuration is initiated, and, in step 410, the "golden" configuration file is placed with the storage system 200. With respect to FIG. 4, the data storage subsystem of FIGS. 1 and 2 represents an "other" data storage subsystem to which the "golden" configuration file has been distributed. In step 420, the physical hardware comprising storage system 200 and the server blades 105 are installed in a blade system 115, for example at a customer location, in the identical slots as the original "golden" configuration.

The "golden" configuration is implemented, beginning at step 422, in which the management module 170 initiates the power on of the blade system, for example the baseboard management controller 180, to place the blades in a standby state, and disables the zoning of the zoneable switch 185. In one embodiment, the management module comprises program code causing the management module to disable the zoning. In another embodiment, the hardware arrangement of step 420 is such that the storage system is placed in the slot 150 that is naturally powered on first, and the storage system passes code, for example over an external network, to the management module 170 before the remaining slots are powered on. Once the zoning has been disabled, the management module, in step 432, sequences power to all the slots 131-139 and slot 150, comprising the server blades 105 and the storage system(s) 200 (if the storage system has not already been powered on.

In step 443, the storage system implements the "golden" configuration, creating the logical configuration from the "golden" configuration file. The logical configuration of the storage system, such as the RAID configuration, may have been preset, and the operation creating the logical configuration comprises relating the utilization of the volumes to the hosts, but using "placeholder" hosts as substitute names until the actual server blades log on.

The logical configuration arranges the "placeholder" hosts so that they match the desired order of log on of the server blades, given the zoneable switch port enablement sequence of the "golden" configuration file.

In step 447, the storage system 200 transfers the port enablement sequence information to the zoneable switch 185. There is no direct connection from the storage system to the zoneable switch since the zoning has been disabled such that no ports are enabled. In one embodiment, the storage system transfers the port enablement sequence to the switch over an external network interface. In another embodiment, the port enablement sequence is transferred with the code that was passed to the management module 170, above, and the management module will be configured to transfer the port enablement sequence to the zoneable switch.

In step 450, the storage system 200 reports "ready" to the management module, giving sufficient time for all of the servers to boot up after having been powered on.

In step 470, in response to "ready" from the storage system, the management module operates the blade system, for example, the baseboard management controller 180, to operate the zoneable switch 185 to enable the ports in the sequential order in accordance with the port enablement sequence. In the example, this may comprise enabling ports zoned between the storage system 200 of slot 150 and the server blades 105 of their respective slots 131-139 in the desired order as provided by the port enablement sequence.

Then in step 470, as the server blades log on to the storage system as the result of the port enablement sequence, the storage system allocates sets of logical volumes of the storage system to each server blade. This allocation or assignment comprises replacing the "placeholder" host names with the server blade WWNs as the server blades log on after having been zoned to the storage system. The server blades thus are logged on individually in the desired sequence order of the sequence information and are thereby configured in accordance with the "golden" configuration map.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A data storage subsystem comprising: a blade system comprising a plurality of slots, said blade system configured to support a plurality of blades; a plurality of server blades, each arranged in a predetermined slot of said blade system; at least one storage system arranged in at least one predetermined slot of said blade system; at least one zoneable switch configured to zone ports thereof, said ports coupled to said plurality of server blades and said at least one storage system; and a management module configured to operate said blade system and to power on said blade system; wherein upon power on of said blade system, disable zoning of said at least one zoneable switch zoning; said management module configured to power on all slots comprising said server blades and said at least one storage system; said storage system, in accordance with a "golden" configuration file comprising port enablement sequence information, said storage system configured to transfer said port enablement sequencing to said at least one zoneable switch; whereby said at least one zoneable switch is configured to enable and zone said ports thereof in said "golden" configuration file enablement sequence to connect said plurality of server blades and said at least one storage system in accordance with said "golden" configuration file enablement sequence; said storage system configured with said "golden" configuration file to log on said server blades in accordance with a log on sequence of said server blades as the result of said "golden" configuration file enablement sequence to logically configure said server blades in accordance with said "golden" configuration file; and wherein said "golden" configuration file comprises mapping of "placeholder" hosts, and wherein said storage system is configured to employ said "golden" configuration file to create a logical configuration matching said "placeholder" hosts to an expected order of log on of said server blades.

2. The data storage subsystem of claim 1, wherein said storage system is configured to employ said "golden" configuration file to replace said "placeholder" hosts by server blade WWNs (world wide names) as said server blades log on.

3. The data storage subsystem of claim 1, wherein said storage system is configured to allocate a set of logical volumes of said storage system to each said server blade in accordance with said "golden" configuration file.

4. The data storage subsystem of claim 1, wherein said management module is configured to, subsequent to said power on sequence, initiate said port zoning enablement of said at least one zoneable switch in response to "ready" from said storage system.

5. A method for replicating data storage subsystem configuration comprising a blade system comprising a plurality of slots and at least one zoneable switch, said blade system configured to support a plurality of blades, said method comprising the steps of: arranging a plurality of server blades in predetermined slots of said blade system; arranging at least one storage system in at least one predetermined slot of said blade system; upon initial power on of said blade system, disable zoning of said at least one zoneable switch; power on all said slots comprising said server blades and said at least one storage system; operating said at least one storage system to, in accordance with a "golden" configuration file comprising port enablement sequence information, transfer said port enablement sequencing to said at least one zoneable switch; operating said zoneable switch to enable and zone ports thereof in accordance with said "golden configuration file enablement sequence, said ports coupled to said plurality of server blades and said at least one storage system; operating said at least one storage system, in accordance with said "golden" configuration file, to log on said server blades to said storage system in accordance with a log on sequence of said server blades as the result of said "golden" configuration file enablement sequence to logically configure said server blades in accordance with said "golden" configuration file; and wherein said "golden" configuration file comprises mapping of "placeholder" hosts, and comprising the step of creating a logical configuration matching said "placeholder" hosts to an expected order of log on of said server blades.

6. The method of claim 5, comprising the step of replacing said "placeholder" hosts with server blade WWNs (world wide names) as said server blades log on.

7. The method of claim 5, additionally comprising the step of allocating a set of logical volumes of said storage system to each said server blade in accordance with said "golden" configuration file.

8. The method of claim 5, wherein said step of operating said zoneable switch additionally comprises subsequent to said power on sequence, initiating said port zoning enablement of said at least one zoneable switch in response to "ready" from said storage system.

9. A computer program product for replicating data storage subsystem configuration comprising a blade system comprising a plurality of slots and at least one zoneable switch, said blade system configured to support a plurality of blades, and comprising a plurality of server blades in predetermined slots of said blade system, and at least one storage system in at least one predetermined slot of said blade system; said computer program product comprising a non-transitory computer readable medium embodying a computer readable program when executed on at least one computer causes the computer to: upon initial power on of said blade system, disable zoning of said at least one zoneable switch; operate said blade system to power on all said slots comprising said server blades and said at least one storage system; operate said at least one storage system to, in accordance with a "golden" configuration file comprising port enablement sequence information, transfer port enablement sequencing to said at least one zoneable switch; operate said zoneable switch to enable and zone ports thereof in accordance with said "golden" configuration file enablement sequence, said ports coupled to said plurality of server blades and said at least one storage system; operate said at least one storage system, in accordance with said "golden" configuration file, to log on said server blades to said storage system in accordance with a log on sequence of said server blades as the result of said "golden" configuration file enablement sequence to logically configure said server blades in accordance with said "golden" configuration file; and wherein said "golden" configuration file comprises mapping of "placeholder" hosts, and wherein said computer executed steps of operating said storage system comprises creating a logical configuration matching said "placeholder" hosts to an expected order of log on of said server blades.

10. The computer program product of claim 9, wherein said computer executed step of operating said storage system comprises replacing said "placeholder" hosts with server blade WWNs (world wide names) as said server blades log on.

11. The computer program product of claim 9, additionally comprising the computer executed step of initiating operation of said storage system to allocate a set of logical volumes of said storage system to each said server blade in accordance with said "golden" configuration file.

12. The computer program product of claim 9, wherein said computer executed step said step of operating said zoneable switch additionally comprises subsequent to said power on sequence, initiating said port zoning enablement of said at least one zoneable switch in response to "ready" from said storage system.

* * * * *